United States Patent
Lewis et al.

(10) Patent No.: US 6,324,499 B1
(45) Date of Patent: *Nov. 27, 2001

(54) NOISE RECOGNIZER FOR SPEECH RECOGNITION SYSTEMS

(75) Inventors: James R. Lewis, Delray Beach, FL (US); Barbara Ballard, Kansas City, MO (US)

(73) Assignee: International Business Machines Corp., Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,122

(22) Filed: Mar. 8, 1999

(51) Int. Cl.[7] .................................................. G10L 15/26
(52) U.S. Cl. ........................................... 703/233; 704/235
(58) Field of Search .................................. 704/233, 200, 704/246, 251, 257, 235, 256, 255, 226, 227, 228

(56) References Cited

U.S. PATENT DOCUMENTS

| | | | |
|---|---|---|---|
| 5,764,852 | * 6/1998 | Williams | 704/243 |
| 5,905,971 | * 5/1999 | Hovel | 704/257 |
| 5,970,446 | * 10/1999 | Goldberg et al. | 704/233 |
| 6,067,514 | * 5/2000 | Chen | 704/235 |
| 6,076,059 | * 6/2000 | Glickman et al. | 704/260 |

OTHER PUBLICATIONS

ICASSP 91. 1991 International Conference on Acoustics, Speech and Signal Processing. Rose et al., "Robust speaker identification in noisy environments using noise adaptive speaker models" pp. 401–404. May 1991.*

* cited by examiner

Primary Examiner—Richemond Dorvil
(74) Attorney, Agent, or Firm—Akerman Senterfitt

(57) ABSTRACT

A method and system for responding to randomly occurring noise in a voice recognition application program. The system receives an audio signal representative of sound in an audio environment and processes the audio signal to identify certain non-speech sounds. A pre-defined action is performed in response to the non-speech sound which has been identified. The pre-defined action is selected from the group consisting of disabling a microphone source of the audio signal, suspending further processing of the audio signal by the speech recognition system, executing a user-defined macro, and ignoring the sound. The system may perform additional steps including recording a sound which is to be identified as a non-speech sound and assigning one of the pre-defined actions to be performed in response when the non-speech sound has been identified.

18 Claims, 5 Drawing Sheets

NOISE RECOGNIZER FOR SPEECH RECOGNITION SYSTEMS

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition software and more particularly to a system for eliminating mis-recognitions of spoken words resulting from randomly occurring background noises in an acoustic environment.

2. Description of the Related Art

In recent years software developers have devised various application programs to enable computers to recognize spoken words in various languages. A common problem when using such voice recognition software in a home or office setting is mis-recognitions of spoken words when randomly occurring background noises occur. As used herein, the phrase "randomly occurring background noise" refers to those noises which are random with respect to their occurency in an acoustic environment such as an office. Examples of randomly occurring background noises include telephone ringers, file drawers opening and closing, sneezing, coughing, breathing noises and the like. These randomly occurring noises are to be distinguished from those noises which are merely random in their noise characteristics, such as white noise. In any case, the problem of randomly occurring noises is particularly acute when the user has a far field microphone.

Conventional speech recognition software applications do not distinguish or respond appropriately to randomly occurring noises. Thus, speech recognition systems using far-field desktop or monitor microphones that do not have noise-canceling capability tend to have low recognition accuracy because they cannot distinguish between randomly occurring environmental noise and speech. Conversely, near field microphones, such as those used in headsets, are less prone to problems arising from randomly occurring environmental noise. However, such microphones are more prone to reception of randomly occurring noise in the form of inadvertent personal noises, such as breathing, coughing or sneezing. Accordingly, there exists a need for voice recognition systems to have a more sophisticated ability to intelligently handle randomly occurring noises including environmental noises and personal noises.

SUMMARY OF THE INVENTION

Certain events can be anticipated and associated with randomly occurring noises. For example, when a user is making use of a computer voice recognition application and a nearby telephone rings, the user may wish to answer that telephone. Under these circumstances, it will normally be desirable for the voice recognition process to be suspended. Alternatively, for certain other types of randomly occurring noises, e.g. a telephone ringing in an adjacent cubicle, it may be more appropriate for the voice recognition software to ignore the noise. In either case, the randomly occurring noise should not be interpreted as a spoken word.

With the present system, frequent randomly occurring noises such as background office noise or personal noises are mapped to perform one of four actions. In particular, such noises can be mapped to various computer voice recognition functions so that they are either (1) ignored by the voice recognition application, (2) cause operation of the speech recognition system to be suspended, (3) cause a microphone input to be turned off, or (4) execute a user defined macro. Different randomly occurring noises may require a different response. For example, when the operation of the speech recognition system is suspended, it is possible to resume use of the speech system only with a special voice command such as "wake up". This is possible since the microphone remains on even though the speech recognition function is suspended. Conversely, if the microphone is simply turned off, the speech system cannot be caused to resume operation by means of a speech command. One of the foregoing alternatives may be more appropriate than the other in certain circumstances and it is therefore important to allow the user flexibility to control the specific response selected for a particular randomly occurring noise.

A dialog allows the user to specify the name of a noise and the action to be performed when the noise occurs. Additionally, each noise can be recorded as it sounds through the microphone. If the system cannot recognize the particular noise sufficiently to be able to distinguish it again, the system notifies the user.

Thus, the invention concerns a method and system for responding to randomly occurring background noise. The system receives an audio signal representative of sound in an audio environment and processes the audio signal to identify certain non-speech sounds. A pre-defined action is performed in response to the non-speech sound which has been identified. The pre-defined action is selected from one of the group consisting of disabling a microphone source of the audio signal, suspending further processing of the audio signal by the speech recognition system, and executing a user-defined macro.

The system may perform additional steps including recording a sound which is to be identified as a non-speech sound and assigning one of the pre-defined actions to be performed in response when the non-speech sound has been identified. In one instance, the non-speech sound may be a telephone ringer. In another instance, the non-speech sound can be a personal sound.

The system permits speech recognition to occur more smoothly in an open-plan office layout and in other noisy environments. For noise canceling microphones, noise recognition will eliminate some mis-recognitions caused by nearby noises, such as telephone and keyboard noises. For microphones without the noise canceling feature, noise recognition will significantly enhance accuracy by preventing randomly occurring environmental noises from being recognized as speech. The invention also allows users who have exceptional difficulties with breath noises to avoid interpretation of these randomly occurring personal noises as speech and thereby enjoy the benefit of speech recognition software.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

Figure 1:
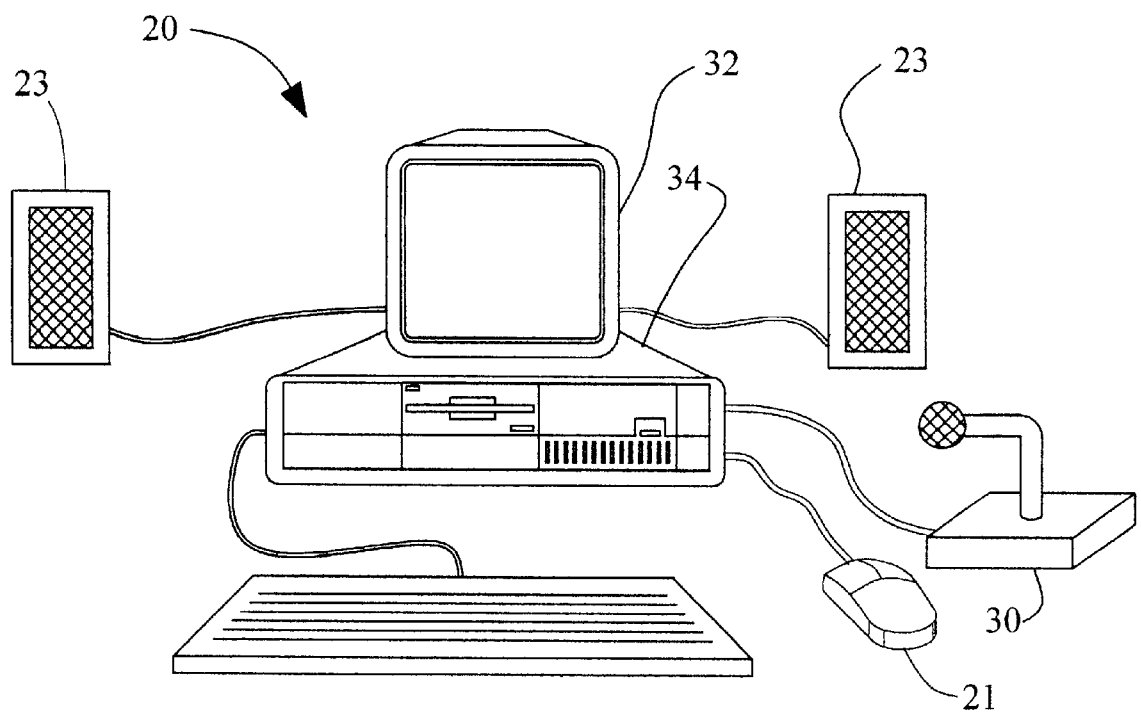
FIG. 1 is a computer system which may be used to implement the present invention.

FIG. 1 shows a typical computer system 20 for use in conjunction with the present invention. The system is preferably comprised of a computer 34 including a central processing unit (CPU), one or more memory devices and associated circuitry. The system also includes a microphone 30 operatively connected to said computer system through suitable interface circuitry or "sound board" (not shown), and at least one user interface display unit 32 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation or any similar microprocessor. Speakers 23, as well as an interface device, such as mouse 21, may also be provided with the system, but are not necessary for operation of the invention as described herein.

The various hardware requirements for the computer system as described herein can generally be satisfied by any one of many commercially available high speed multimedia personal computers offered by manufacturers such as International Business Machines Corporation (IBM), Compaq, Hewlett Packard, or Apple Computers.

Figure 2:
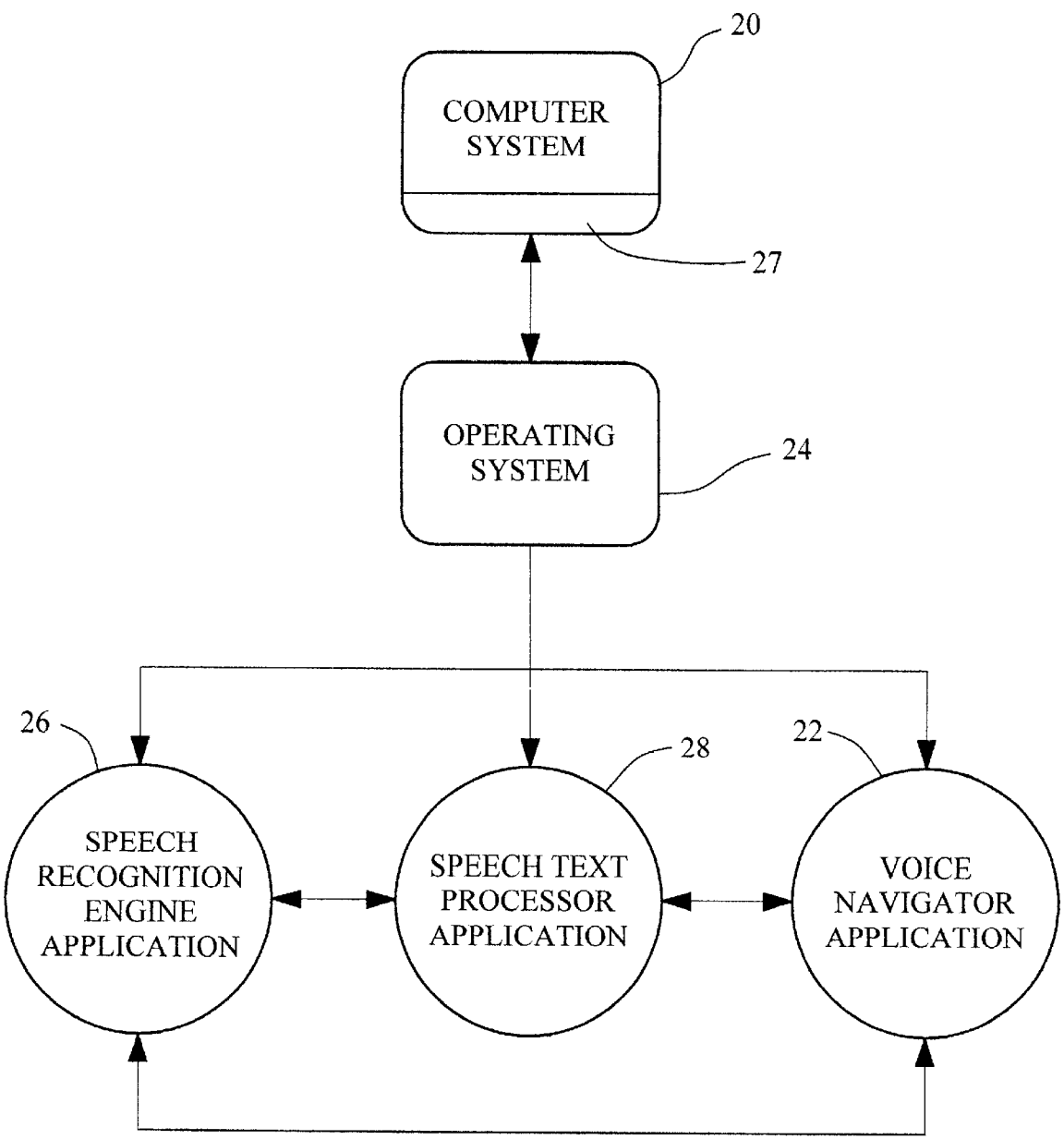
FIG. 2. is a block diagram which illustrates the basic architecture of the system according to the present invention.

FIG. 2 illustrates a typical architecture for a speech recognition system in computer 20. As shown in FIG. 2, the system typically includes an operating system 24, a speech recognition engine application 26, a speech text processor application 28, and a voice navigator application 22. The noise recognizer according to one embodiment of the invention is preferably implemented within the speech recognition engine application 26 as shown in FIG. 2.

In a preferred embodiment which shall be discussed herein, operating system 24 is one of the Windows family of operating systems, such as Windows NT, Windows 95 or Windows 98 which are available from Microsoft Corporation of Redmond, Wash. However, the system is not limited in this regard, and the invention may also be used with any other type of computer operating system. The system as disclosed herein can be implemented by a programmer, using commercially available development tools for the operating systems described above. As shown in FIG. 2, computer system 20 includes a computer memory device 27, which is preferably comprised of an electronic random access memory and a bulk data storage medium, such as a magnetic disk drive.

In FIG. 2, the speech recognition engine 26, speech text processor 28 and the voice navigator 22 are shown as separate application programs. It should be noted however that the invention is not limited in this regard, and these various application could, of course be implemented as a single, more complex application program. Also, if no other speech controlled application programs are to be operated in conjunction with the speech text processor application and speech recognition engine, then the system may be modified to operate without the voice navigator application. The voice navigator primarily helps coordinate the operation of the speech recognition engine application.

Audio signals representative of sound received in microphone 30 are processed within computer 20 using conventional computer audio circuitry so as to be made available to the operating system 24 in digitized form. The audio signals received by the computer are conventionally provided to the speech recognition engine application 26 via the computer operating system 24 in order to perform speech recognition functions. As in conventional speech recognition systems, the audio signals are processed by the speech recognition engine 26 to identify words spoken by a user into microphone 30.

Figure 3:
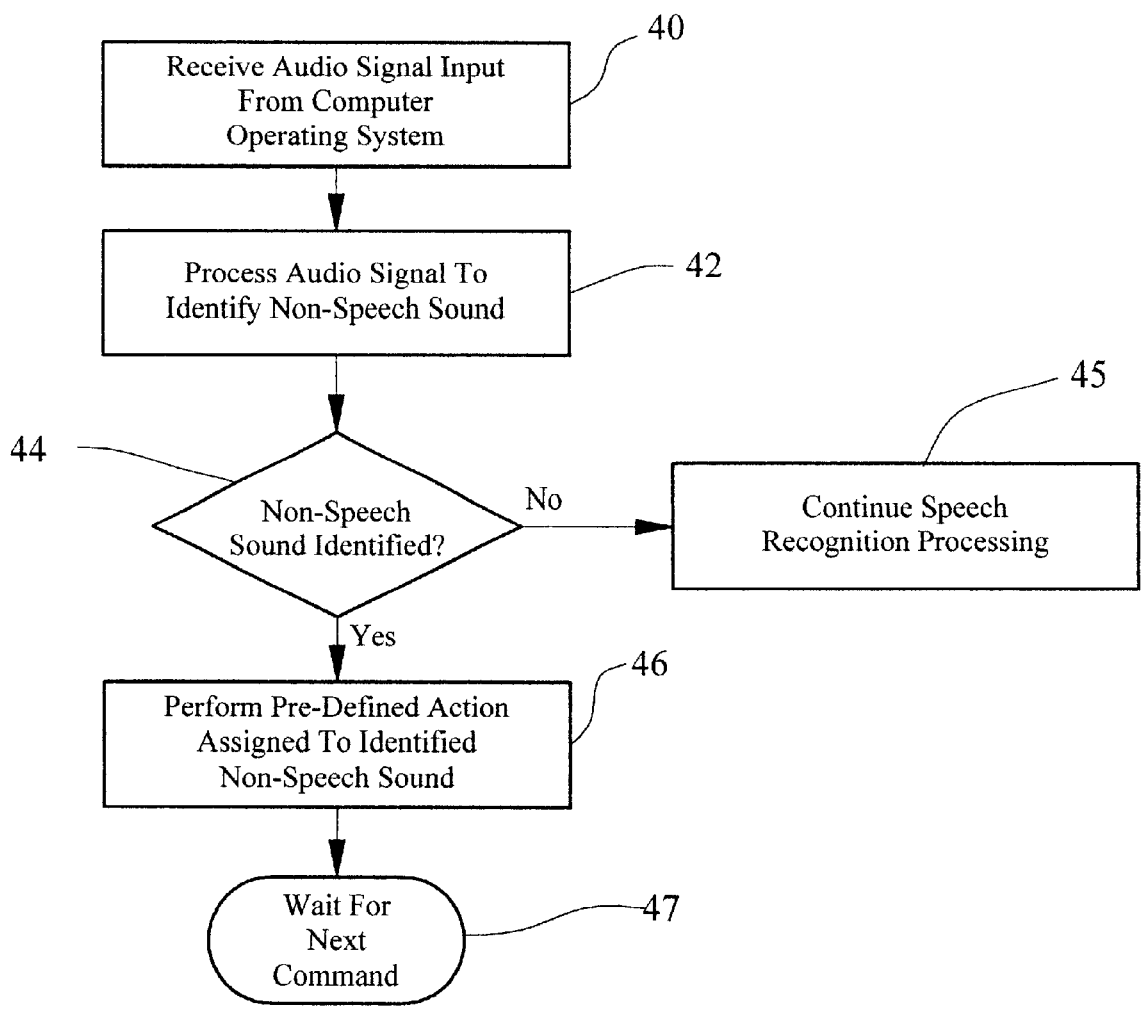
FIG. 3 is a flow chart for a noise recognition system according to the invention.

In a preferred embodiment of the invention shown in FIG. 3, additional noise recognition processing is performed in the speech recognition engine application. As shown in step 40, audio signals are received from the computer operating system. These audio signals are subsequently processed in step 42 to identify certain sounds which have been designated as non-speech. The specific sounds which are designated as non-speech may be pre-programmed by the application developer. However, in a preferred embodiment of the invention which shall hereinafter be described in more detail, the non-speech sounds may be recorded and identified as such by a user.

In step 44, a decision is made as to whether the non-speech sound has been identified. If the non-speech sound is identified, then the pre-defined actions assigned to that sound are performed in step 46. The pre-defined actions in step 46 can be any suitable sequence of actions to be performed by the computer 20 in response to the non-speech sound. Thus, for example, users might want to answer the phone on their desk when it rings. In that case, the pre-defined action might be to turn off the microphone for the voice recognition system when that particular noise occurs. Consequently, every time the telephone rings the microphone will turn off. Alternatively, other users might have speech recognition problems when the telephone of a cubicle neighbor rings. These users would specify that their systems are to ignore such noises.

Figure 4:
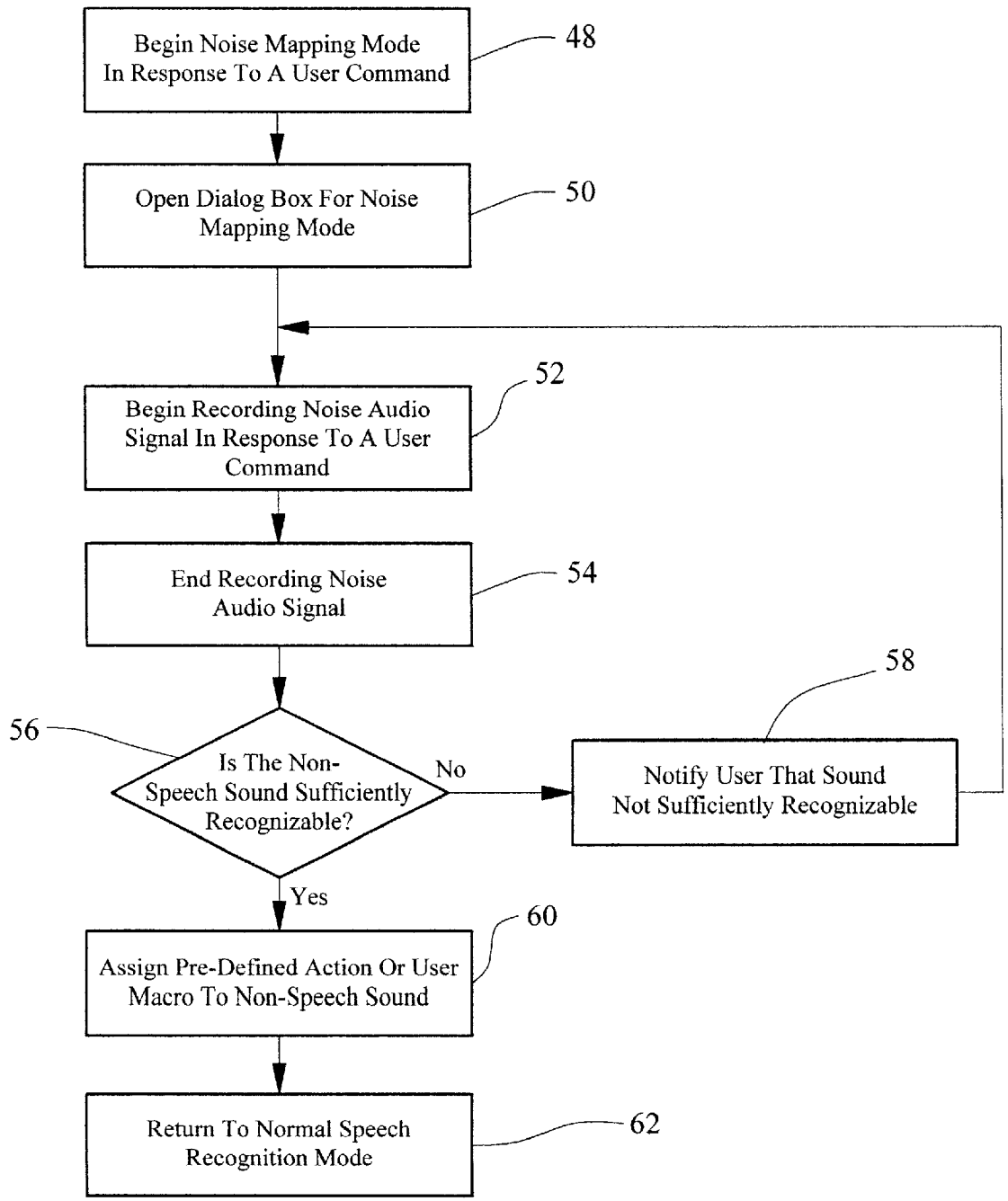
FIG. 4 is a flow chart showing a method for mapping randomly occurring noises.
Figure 5:
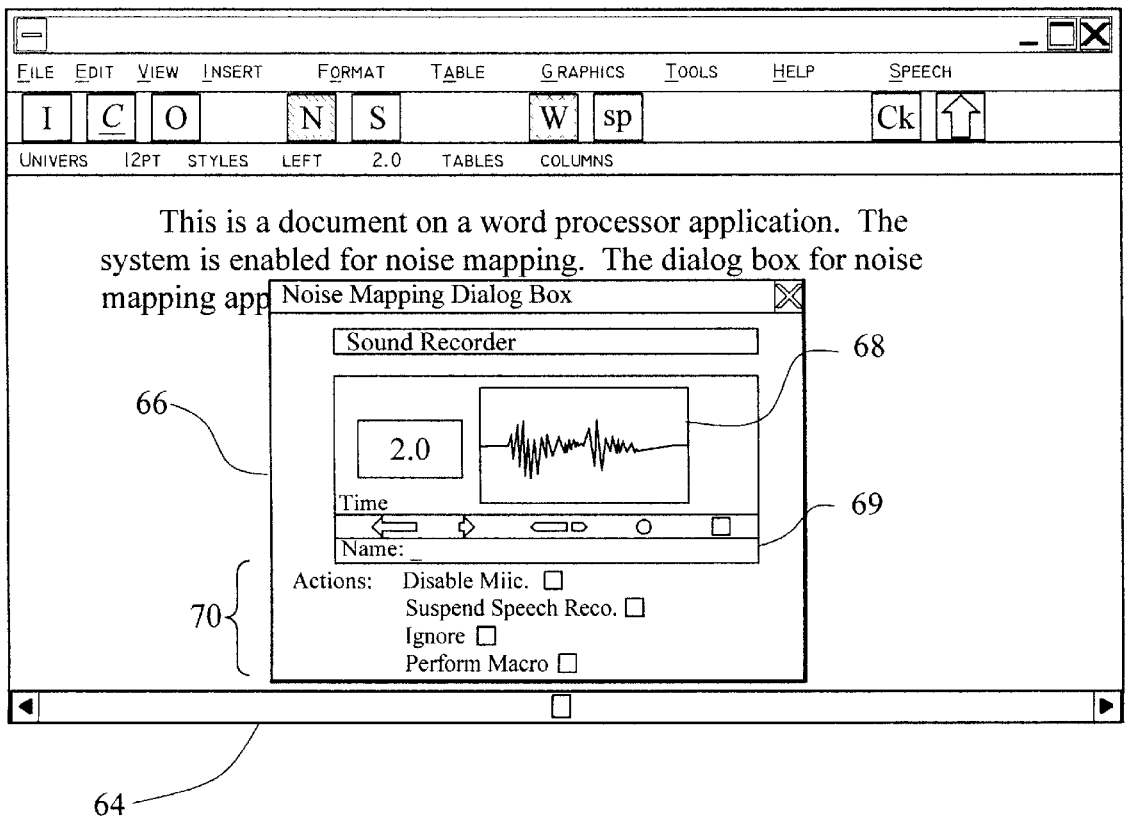
FIG. 5 is shows a dialog box for permitting a user to map certain noises to pre-defined actions.

FIG. 4 is a flow chart showing the manner in which a non-speech sound may be mapped to a pre-defined action or macro by a user. As show in step 48 of FIG. 4, the process begins by user command which causes the noise recognition system to enter a noise mapping mode. As shown in FIG. 5, the system responds by opening a dialog box 66 for the noise mapping mode. In FIG. 5, the dialog box appears on top of the window 64 for an application program which is active. In this example, the application program is a word processing application. However, it will be appreciated that the invention is not limited in this regard. As shown in FIG. 5, the dialog box 66 provides the necessary controls and inputs to allow a user to record particular randomly occurring noises and associate such noises with specific actions to be performed by the system in response thereto. Thus, the dialog box 66 includes a sound recorder 68, a combo box 69 to identify the name of the noise type, and a set of actions 70 to be performed in response to the particular randomly occurring noise. As shown in FIG. 5, the actions to be performed include turning off the microphone, suspending speech recognition or simply ignoring the sound. By checking off a box associated with a particular action, the system will understand that such action is to be performed in response to the particular noise. Of course, these action types are merely examples and it will be understood by those skilled in the art that any other suitable action can be made available to the user in the dialog box. Further, it may be noted that a user defined set of actions can also be created by selecting the check box 72 for "Perform Macro".

When a user is ready to map the particular randomly occurring noise to an action, the sound recorder 68 is initiated and the particular noise is recorded in steps 52 and 54 of FIG. 4. Thus, for example a user might record the sound of a telephone ringing at his desk, breathing noise or keyboard noise. After the noise is recorded the system preferably evaluates each noise in step 56 to determine if it is sufficiently distinguishable to be recognized again when the noise occurs. If the system determines that the sound sample is inadequate for any reason such that it cannot distinguish the noise should it occur again, then the user is notified in step 58. The user may then have the opportunity to record the noise again. One example of a criteria which may be used to determine whether the sound sample is adequate is a determination of the signal to noise ratio for the recording. If it exceeds a preprogramed value, the sample is adequate, otherwise it is not. Additional processing can also be provided to determine whether the sample is phonetically identical to a word in the existing system vocabulary set. In such instances, the system might prompt the user regarding the conflict. If the sample is sufficient to be distinguished in the event of future occurrences, then the actions selected by the user are mapped to the particular noise and will occur each time the particular noise is detected. Significantly, the system can improve overall efficiency of the speech recognition system by processing non-speech sounds before they are received by the speech recognition engine. In this way, the recognized non-speech sounds are not processed at all by the speech recognition engine so that overall speech recognition accuracy may be improved.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. In a speech recognition system, a method for responding to randomly occurring environmental and personal noises, comprising the steps of:
   identifying and recording at least one randomly occurring noise selected from the group consisting of environmental and personal noises;
   mapping said at least one identified and recorded randomly occurring noise to a pre-defined action; and,
   in response to receiving a randomly occurring noise which has been mapped to a pre-defined action, performing said pre-defined action.

2. The method according to claim 1 wherein said pre-defined action is selected from one of the group consisting of disabling a microphone source of an audio signal, suspending further processing of said audio signal by the speech recognition system, executing a user-defined macro, and ignoring said randomly occurring noise.

3. The method according to claim 1 comprising the further step of:
   assigning one of said pre-defined actions to be performed in response when said randomly occurring background noise has been identified.

4. The method according to claim 1 wherein said environmental noise is selected from the group consisting of keyboard noises and a telephone ringer.

5. A system for responding to randomly occurring environmental and personal noises in a speech recognition application, comprising:
   audio means for recording an audio signal representative of a randomly occurring noise selected from the group consisting of environmental and personal noises;
   mapping means for mapping said recorded randomly occurring noise to a pre-defined action; and,
   system reconfiguration means for performing said pre-defined action in response to receiving a noise which is identified as said randomly occurring noise.

6. The system according to claim 5 wherein said pre-defined action is selected from one of the group consisting of disabling a microphone source of an audio signal, disabling audio sound processing means for processing said audio signal, disabling speech recognition processing performed by the system, executing a user-defined macro, and ignoring the randomly occurring background noise.

7. The system according to claim 6 further comprising means for assigning one of said pre-defined actions to be performed in response when said randomly occurring background noise has been identified.

8. The system according to claim 5 wherein said environmental noise is selected from the group consisting of keyboard noises and a telephone ringer.

9. A machine readable storage, having stored thereon a computer program having a plurality of code sections executable by a machine for causing the machine to perform the steps of:
   identifying and recording at least one randomly occurring noise selected from the group consisting of environmental and personal noises;
   mapping said at least one identified and recorded randomly occurring noise to a pre-defined action; and,
   in response to receiving a randomly occurring noise which has been mapped to a pre-defined action, performing said pre-defined action.

10. The machine readable storage according to claim 9 wherein said pre-defined action is selected from one of the group consisting of disabling a microphone source of an audio signal, suspending further processing of said audio signal by the speech recognition system, executing a user-defined macro, and ignoring said randomly occurring noise.

11. The machine readable storage according to claim 9 comprising the further step of:
   assigning one of said pre-defined actions to be performed in response when said randomly occurring background noise has been identified.

12. A method for responding to randomly occurring background noise in a speech recognition system, comprising the steps of:
   receiving an audio signal representative of sound in an audio environment;
   continuously determining from said audio signal if said audio signal originated as speech or at least one of a randomly occurring noise selected from the group consisting of environmental and personal noises; and,
   executing a pre-defined function mapped to said randomly occurring noise in accordance with said determining step.

13. The method according to claim 12, further comprising the step of executing speech recognition of said audio signal unless said sound is determined to have originated as at least one of said randomly occurring noise selected from the group consisting of environmental and personal noises.

14. The method according to claim 12, further comprising the step of interrupting speech recognition of said audio signal when said sound is determined to have originated as at least one of said randomly occurring noise selected from the group consisting of environmental and personal noises.

15. The method according to claim 14, further comprising the step of executing a user-defined macro after said interrupting step.

16. The method according to claim 12, wherein said predefined function is to ignore said audio signal if it is determined to have originated as at least one of said randomly occurring noise selected from the group consisting of environmental and personal noises.

17. The method of claim 12, comprising the step of executing at least one of a plurality of pre-defined functions in accordance with said determining step.

18. The method of claim 12, further comprising the steps of:

recording randomly occurring noises selected from the group consisting of environmental and personal noises;

associating a respective pre-defined function with each recorded randomly occurring noise; and, upon detection of any one of said at least one of said randomly occurring noises by said determining step, automatically executing said respective pre-defined function associated with said detected randomly occurring noise.

\* \* \* \* \*